(12) United States Patent
Bayer et al.

(10) Patent No.: US 7,980,365 B2
(45) Date of Patent: Jul. 19, 2011

(54) BRAKE FOR A UTILITY VEHICLE

(75) Inventors: Klaus Bayer, Marktoberdorf (DE); Sven Krieger, Marktoberdorf (DE); Robert Honzek, Oberthingau (DE); Johann Dobler, Legau (DE)

(73) Assignee: AGCO GmbH, Marktoberdorf (DE)

( * ) Notice: Subject to any disclaimer, the term of this patent is extended or adjusted under 35 U.S.C. 154(b) by 0 days.

(21) Appl. No.: 12/742,007

(22) PCT Filed: Oct. 30, 2008

(86) PCT No.: PCT/EP2008/009157
§ 371 (c)(1),
(2), (4) Date: Jul. 7, 2010

(87) PCT Pub. No.: WO2009/059720
PCT Pub. Date: May 14, 2009

(65) Prior Publication Data
US 2010/0263969 A1    Oct. 21, 2010

(30) Foreign Application Priority Data

Nov. 8, 2007   (DE) .......................... 10 2007 053 267
Nov. 8, 2007   (DE) .......................... 10 2007 053 325

(51) Int. Cl.
*F16D 55/36*    (2006.01)
(52) U.S. Cl. .................... 188/71.5; 192/48.61; 188/170
(58) Field of Classification Search ................ 188/18 A, 188/71.5, 170, 72.4; 192/48.61
See application file for complete search history.

(56) References Cited

U.S. PATENT DOCUMENTS
4,024,936 A    5/1977   Crabb
(Continued)

FOREIGN PATENT DOCUMENTS
DE    199 03 564 A1   8/2000
(Continued)

OTHER PUBLICATIONS

International Search Report dated Feb. 5, 2009 cited in Application No. PCT/EP2008/009157 88988 Patent Trademark Office.

*Primary Examiner* — Christopher P Schwartz

(57) ABSTRACT

A brake mechanism for a utility vehicle which can be installed around a drive shaft or inside a wheel hub. The brake has a non rotatable fixed body (200), a rotatable body (100) rotatable relative to the fixed body (200), at least one brake disc (207) which is non-rotatably relative to the fixed body (200), and at least one rotating brake disc (107) which is fixed for rotation with the rotatable body (100). An actuating member (234) can press the fixed brake disc (207) and the rotating brake disc (107) against each other and against a stop surface (209) on the fixed body to apply the brake. A spring means (230) also exerts an immobilizing force on the actuating member (234) to press the fixed brake disc (207) and the rotating brake disc (107) against each other to apply the brake. A brake release means (231, 233) can exert a brake release force which counteracts the immobilizing force of the spring so that the actuating member (234) no longer presses the fixed brake disc (207) and the rotating brake disc (107) against each other, and a brake applying means (235) can exert a pushing force on the actuating member (234) in the same direction as the immobilizing force to press the fixed brake disc (207) and the rotating brake disc (107) against each other to apply the brake.

6 Claims, 8 Drawing Sheets

U.S. PATENT DOCUMENTS

| | | | |
|---|---|---|---|
| 4,263,991 A * | 4/1981 | Morgan et al. | 188/170 |
| 4,560,034 A * | 12/1985 | Windish et al. | 188/72.3 |
| 4,562,903 A * | 1/1986 | Rogier | 188/18 A |
| 4,947,966 A * | 8/1990 | Huff | 188/170 |
| 5,050,710 A | 9/1991 | Bargfrede | |
| 5,348,122 A * | 9/1994 | Brundrett | 188/71.5 |
| 5,701,976 A * | 12/1997 | Kumagai et al. | 188/71.5 |
| 6,357,558 B1 * | 3/2002 | Case et al. | 188/71.5 |
| 2001/0053730 A1 | 12/2001 | Panizzolo | |

FOREIGN PATENT DOCUMENTS

| | | |
|---|---|---|
| EP | 0 684 402 A1 | 11/1995 |
| EP | 0 913 304 A2 | 5/1999 |
| EP | 1 067 305 A2 | 1/2001 |
| EP | 1 329 643 A2 | 7/2003 |
| EP | 1 500 839 A2 | 1/2005 |
| EP | 1 584 834 A1 | 10/2005 |
| FR | 2 796 886 | 2/2001 |
| GB | 1 504 073 | 3/1978 |
| GB | 1 572 153 | 7/1980 |
| WO | WO 83/03124 | 9/1983 |
| WO | WO 2005/001304 A1 | 1/2005 |
| WO | WO 2009/059720 A1 | 5/2009 |

* cited by examiner

BRAKE FOR A UTILITY VEHICLE

The invention relates to a brake for use in an agricultural utility vehicle, for example a tractor, which includes both a parking brake and a service brake. Such a brake can be housed in a drive train of the vehicle or in a wheel hub of the vehicle.

During operation of agricultural utility vehicles it is necessary to provide service brakes and parking brakes which, owing to the great weight of the vehicle and the towed loads as well as owing to legal regulations, have to fulfil certain performance requirements. It is therefore necessary for a service brake on at least one axle downstream of the differential to have to be able to act independently on the left and right wheel in each case in agricultural utility vehicles. Furthermore it is conventional for a parking brake to be able to act as an auxiliary brake on the two wheels respectively of at least one axle in order to satisfy statutory provisions.

It is well known to provide brakes on the rear axle of a tractor acting on drive shafts on either side of the differential, on a drive shaft which powers the front axle in order to brake both front wheels, and also in the wheel hub of a driven or non-driver wheel.

It is an object of the present invention to provider a brake mechanism which is of a compact construction and which is suitable for use to provide a parking and service brake function on a drive shaft or in a wheel hub.

Thus according to the present invention there is provided a brake mechanism for a utility vehicle comprising:
a non rotatable fixed body,
a rotatable body rotatable relative to the fixed body,
at least one brake disc which is non-rotatably relative to the fixed body,
at least one rotating brake disc which is fixed for rotation with the rotatable body,
a stop surface on the fixed body,
an actuating member which can press the fixed brake disc and the rotating brake disc against each other and against the stop surface to apply the brake,
a spring means which exerts an immobilising force on the actuating member to press the fixed brake disc and the rotating brake disc against each other to apply the brake,
a brake release means which can exert a brake release force which counteracts the immobilising force of the spring so that the actuating member no longer presses the fixed brake disc and the rotating brake disc against each other, and
brake applying means which can exert a pushing force on the actuating member in the same direction as the immobilising force to press the fixed brake disc and the rotating brake disc against each other to apply the brake.

As a result of the fact that the parking brake and the service brake act on the discs from the same side and therefore only one actuating device is necessary for the parking brake and the service brake, the space requirement and structural weight may advantageously be reduced by omission and simplification of components.

The actuating member may be an annular actuating position slidable in a bore in the fixed body.

The brake applying means may be on annular hydraulic chamber which acts on the annular actuating piston.

The brake release means may be an annular brake release piston on which a brake release hydraulic chamber acts, the brake release piston acting in the opposite direction to the spring means.

The spring means preferably act on the annular brake piston which in turn acts on the annular actuating piston which in turn presses the brake discs into contact to apply the brake.

This above construction provides simple components with small dimensions.

The force application points of the immobilising force, brake release force and pushing force act in an approximately straight line. This again allows small components due to the line of application of the forces.

The annular actuating piston is constructed at least partially around the annular brake release piston. This saves further space in the axial direction.

If the brake mechanism is arranged on a gear output shaft or if the rotatable body is a gear output shaft and the fixed body is a gear casing then this advantageously allows the parking brakes or combined parking and service brakes on a rear axle or front axle to be omitted.

The need for a parking brake on both wheels of the respective axle is dispensed with by providing the brake mechanism upstream of the axle differential. The number of components, the installation space and the costs are reduced as a result.

If the brake mechanism arranged on a gear output shaft is a wet brake then the brake mechanism can, despite relatively high speeds of the gear output shaft, advantageously ensure effective and efficient cooling and wear reduction both in the case of a service brake and in the case of an auxiliary or parking brake via the gear oil supply which is already equipped with efficient cooling and filtering devices.

If the brake mechanism is arranged on shaft between the gear and the differential of a front or rear axle the brake mechanism can be provided as an inherently enclosed module, and this facilitate maintenance, repair and replacement.

If the brake release annular piston and actuating annular piston can be brought into contact across a common supporting plane at an end face in each case, a large force can advantageously be transmitted across a large area with low surface pressure.

Use of a disc spring assembly, which is coaxial with the gear output shaft, as a spring means advantageously allows a high immobilising force with a compact design.

Use of a plurality of radially distributed spring assemblies instead of the disc spring assembly which is coaxial with the gear output shaft advantageously allows greater redundancy, and therewith reliability, on the one hand and greater flexibility in the configuration of the location of the spring means on the other.

A brake mechanism in accordance with the present invention is also suitable for use in a wheel hub when the rotatable body is a wheel housing and the fixed body is a wheel bearer or a component non-rotatably connected thereto.

The brake mechanism of the present invention will now be described, by way of example, with the aid of several embodiments and with reference to the following drawings in which:—

Figure 1:
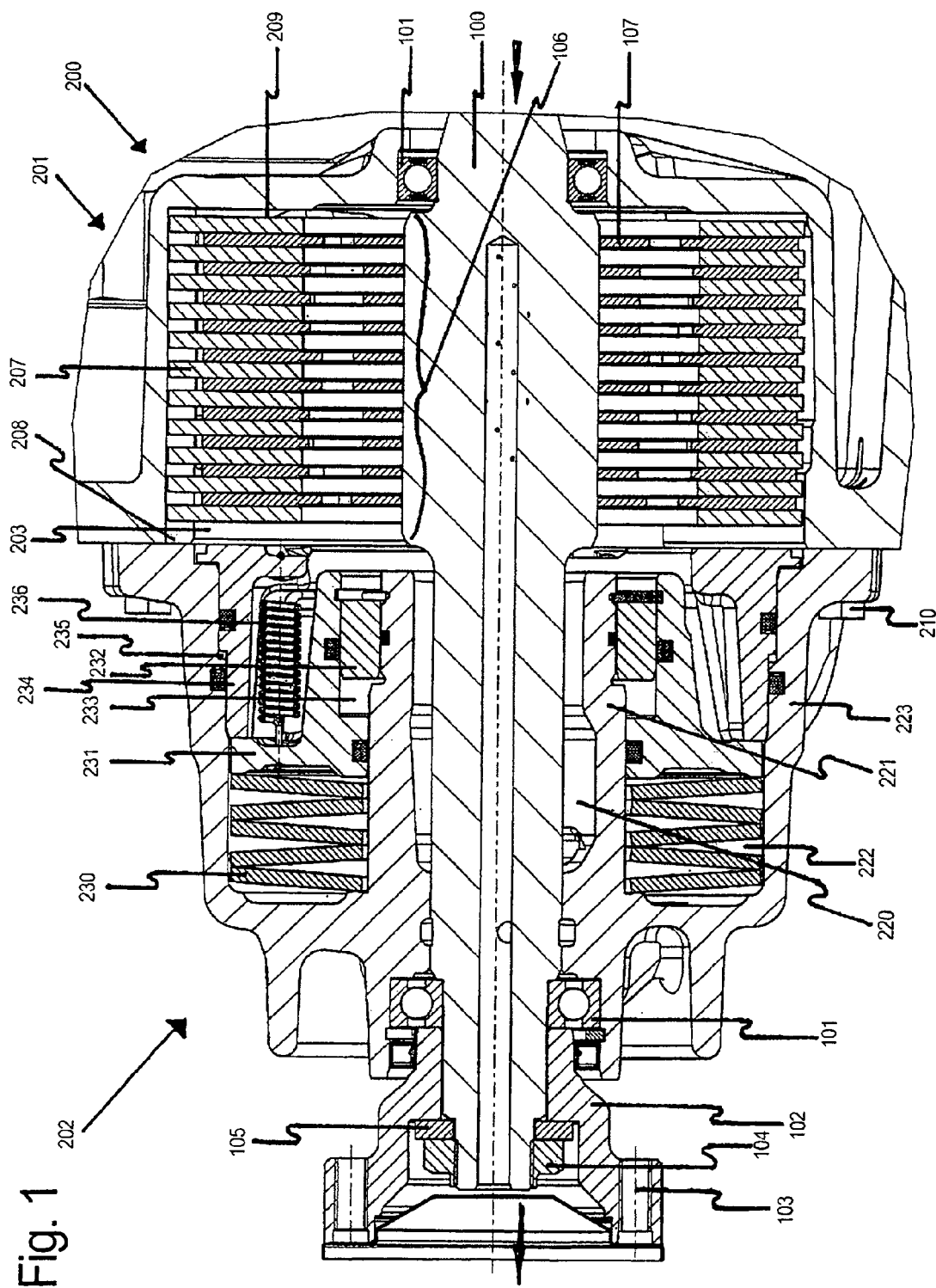
FIG. 1 shows a sectional view of a drive shaft brake according to a first embodiment.

An overview of the construction of the drive shaft brake will be given hereinafter.

Speed and torque are generated by an engine (not shown), usually an internal combustion engine, and are transmitted by a clutch (not shown) to a conventional continuously variable gear (not shown). Speed and torque, optionally changed by the gear, are transmitted to a drive train (not shown) of a rear axle (not shown). Speed and torque are transmitted by a four-wheel engaging clutch (not shown) to a gear or drive output shaft 100 for driving a drive train (not shown) for a front axle. The gear output shaft 100 is rotatably mounted about its axis of rotation in a gear casing 200 via bearings 101. A fastening flange 102 with drill holes 103 is provided at its output end in order to be connected to the drive train for the front axle. The fastening flange 102 is axially fixed by a nut 104 between a plate 105 and one ball bearing 101 and is non-rotatably connected to the gear output shaft 100 by interference fit, teeth or a feather key connection. A disc region 106, in which the diameter of the shaft 100 is enlarged to reduce a tangential force for transmission, is situated at the end of the gear output shaft 100 adjacent the gear. A plurality of rotatable brake discs 107 are arranged in this region and via external teeth (not shown) of the gear output shaft 100 are axially displaceably but non-rotatably connected thereto.

The gear casing 200 will be described hereinafter.

The gear casing 200 is constructed in two parts and comprises a brake disc casing 201 and an actuating casing 202. The brake disc casing 201 surrounds a cylindrical disc chamber 203 which receives the disc region 106 of shaft 100 and the brake discs 107. Furthermore, stationary casing brake discs 207 are provided so as to alternate with the rotatable brake discs 107. The casing brake discs 207 are non-rotatably connected to the disc casing 201 by projections 208 and can be axially displaced relative to casing 201. The axial displacement capacity of the casing brake discs 207 is limited in one direction by a stop mechanism in the form of a pressure plate 209 on a back wall of the disc casing 201. Gear oil is located in the disc chamber 203 and is connected by an opening (not shown) to the gear oil from the gear, so an exchange of gear oil may take place. The gear oil can be cleaned and cooled by suitable mechanisms.

The actuating casing 202 is securely connected to the disc casing 201 by screws 210. The actuating casing 202 has a hole and a cavity 220 in which the gear output shaft 100 is arranged. Separated therefrom by an encircling inner partition 221 there is provided an encircling hollow cylinder shaped actuating chamber 222. This is radially limited by the outer wall 223 of the actuating casing 202. The actuating chamber 222 is axially limited at one side by the outer wall 223 again and opens at the other side toward the disc chamber 203.

The mechanism for a parking brake and a service brake will be described hereinafter.

A disc spring assembly 230 is provided in the actuating chamber 222 so as to rest on the closed axial side thereof and encircle the inner partition 221. Supported by the outer wall 223 the disc spring assembly 230 exerts an immobilising force on a parking brake annular piston 231.

The parking brake annular piston 231 has an axial contact surface on a radial, flange-like projection which at one side rests on the disc spring assembly 230. An encircling projection of the parking brake annular piston 231 extends axially in the direction of the open side of the actuating chamber 222. At its inner circumferential surface the parking brake annular piston 231 has a rectangular change in radius to form a parking brake piston chamber 233. The outer circumferential surface of the inner partition 221 defines the inner circumferential surface of the parking brake piston chamber 233. Moreover a ring 232 is provided on the inner partition 221 and is axially fixed thereto by a circlip ring. One end face of the ring 232 forms the other end face of the parking brake piston chamber 233. The parking brake piston chamber 233 can be filled with a pressurised hydraulic fluid by a hydraulic system (not shown), whereby a brake release force which counteracts the immobilising force of the spring assembly 230 is generated by the parking brake annular piston 231.

One end face of a service brake annular piston 234 rests on a radially outer region of an end face of the radial flange of the parking brake annular piston 231. The service brake annular piston 234 also rests axially displaceably on the inner circumferential surface of the outer wall 223. A service brake piston chamber 235 is formed by a rectangular change in radius at the inner circumferential surface of the outer wall 223 and by a further rectangular change in radius at the outer circumferential surface of the service brake annular piston 234. The service brake piston chamber 235 can be filled with a hydraulic fluid by a service brake hydraulic system (not shown). If the service brake piston chamber 235 is filled with a pressurised hydraulic fluid a pushing force is generated by the service brake annular piston 234 in the direction of the axle brake discs 107 and the casing brake discs 207. These are pressed against the pressure plate 209 and in the process are simultaneously pressed against each other. If hydraulic fluid is released from the service brake piston chamber 235, the service brake annular piston 234 is pulled away from discs 107 and 207 by a restoring spring 236, which is tensioned between the parking brake annular piston 231 and the service brake annular piston 234, in the direction of the parking brake annular piston 231. Thus the rotatable brake discs 107 and the stationary brake discs 207 are not pushed against each other any more.

The function of the brake mechanism will be described hereinafter.

The immobilising force is generated via the disc spring assembly 230 and is transmitted by the parking brake annular piston 231 and the service brake annular piston 234 to the rotatable brake discs 107 and the stationary brake discs 207 so they are pressed against the pressure plate 209, whereby the brake discs 107 and 207 are pressed against each other. The gear output shaft 100 is thus rotationally fixed by the resulting friction and the parking brake function is operating.

To release the parking brake, hydraulic fluid is pumped into the parking brake piston chamber 233 and the parking brake annular piston 231 is moved counter to the immobilising force of the spring assembly 230. The service brake annular piston 234 is also moved in the same direction by the restoring spring 236. The friction between the brake discs 107 and 207 is thus cancelled so that the gear output shaft 100 can freely rotate.

If a driver actuates the service brake while the gear output shaft 100 is rotating fluid is pumped into the service brake piston chamber 235 and the service brake annular piston 234 is moved towards the discs 107 and 207 counter to the force of the restoring spring 236 and without the parking brake annular piston 231. The discs 107 and 207 are pressed together by the pushing force generated thereby and the friction between them increases, whereby rotation of the gear output shaft 100 is decelerated. The frictional heat that is generated in the process is dissipated via the gear oil which at least partially surrounds the discs 107 and 207.

In a case in which the hydraulic system for parking brake and service brake should fail, for example owing to a technical defect, hydraulic fluid escapes from the parking brake piston chamber 231 and the service brake piston chamber 235. In this case the parking brake annular piston 231 and the service brake annular piston 234 are pressed against the brake discs 107 and 207 by the immobilising force of the disc spring assembly 230. In this case a braking effect takes place in a manner comparable to in the preceding section. Since the same components are involved in braking here as in a conventional case of service braking, there need be no fear of the parking brake being overloaded.

Figure 2:
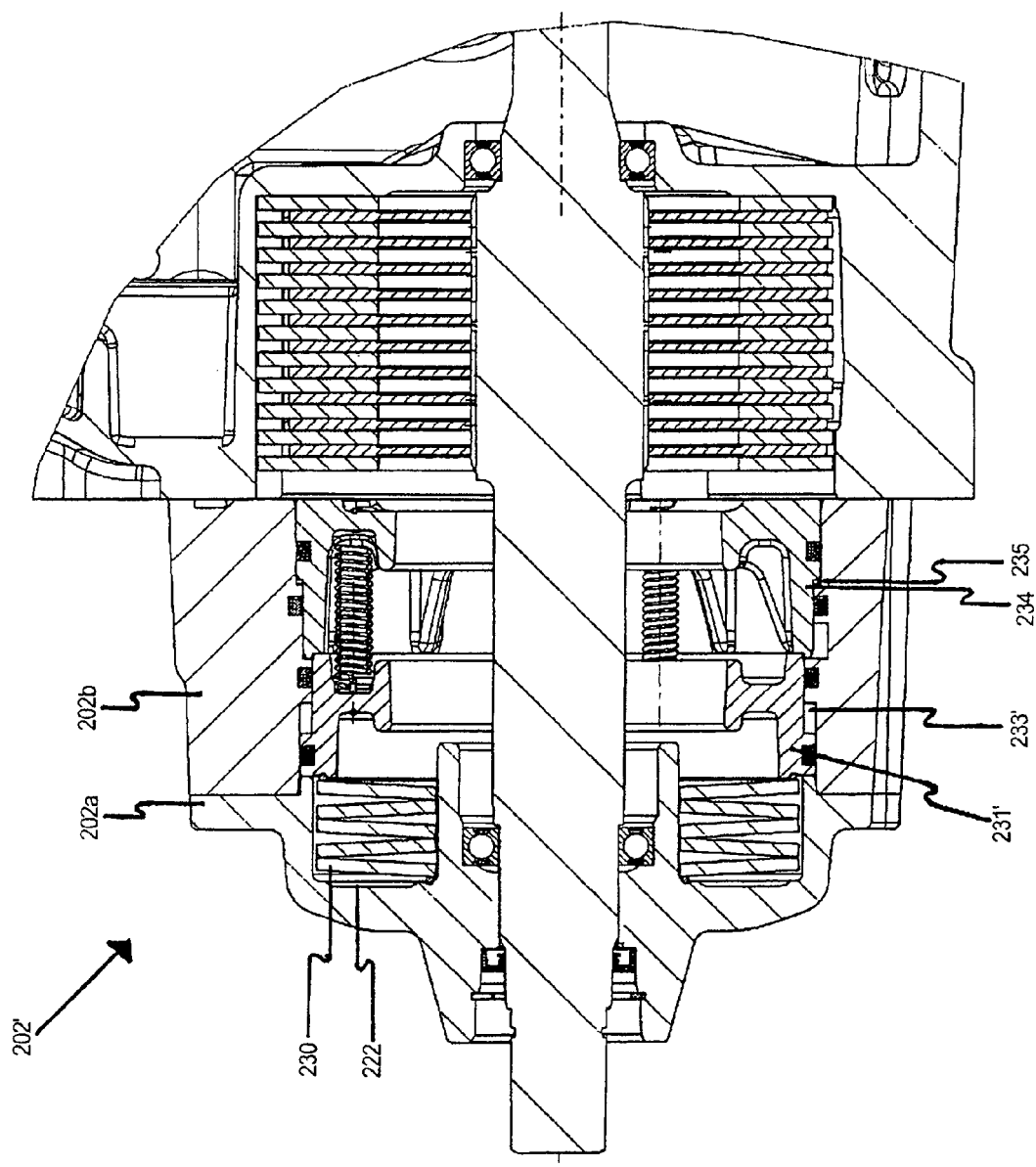
FIG. 2 shows a sectional view of a drive shaft brake according to a second embodiment.

FIG. 2 shows a drive shaft brake which is substantially the same construction as the first embodiment and only the differences from the first embodiment will be discussed hereinafter.

In the second embodiment the actuating casing 202' is constructed in two parts from an actuating casing head 202a and an actuating casing ring 202b. As in the first embodiment a disc spring assembly 230 is accommodated in an actuating chamber 222. A parking brake annular piston 231' is constructed in such a way that it forms a parking brake piston chamber 233' via a change in the radius of its outer circumferential surface and the inner circumferential surface of the actuating casing ring 202b respectively. At one end face it is located along its outer circumference on a service brake annular piston 234, which is constructed as in the preceding embodiment. The force application points of the immobilising force, the brake release force and the pushing force are arranged in an approximately straight line. This means the immobilising force, the brake release force and the pushing force also act in individual force components along or counter to a common linear force flow. They therefore act coaxially even in individual force components. The disc spring assembly 230, the parking brake annular piston 231', the parking brake hydraulic chamber 233', the service brake annular piston 234, the service brake piston chamber 235 and the brake disc assembly are arranged in a line so as to be aligned with one another. This relates not only to the case in which all of the forces of the annular elements are considered, but in particular the case in which individual segments of the annular elements are considered.

Since in this case almost exclusively normal forces and only small shearing forces or bending moments or forces act on the force-transmitting elements, it is possible to make the elements smaller and to reduce the weight accordingly.

It is obvious to a person skilled in the art that modifications to the invention are possible without departing from the inventive idea.

By way of example: with a large internal radius of the actuating chamber 222 it may be necessary to distribute a plurality of spring assemblies over the circumference of the actuating chamber 222 instead of one disc spring assembly which is coaxial to the gear output shaft. Other types of spring may also be used moreover which are coaxially arranged or radially distributed.

In the case of low speeds or low braking forces the brake according to the invention can also be constructed as a dry brake, or instead of the disc assemblies can be constructed with a brake disc or a brake disc and brake shoe respectively.

In the embodiment the brake mechanism is integrated in the gear. The shaft leading into the brake is therefore called the gear output shaft and the casing surrounding the brake mechanism the gear casing. The brake mechanism can also be provided outside of the gear and at any desired spacing therefrom, connected by a shaft which is drive-coupled to the gear output shaft.

FIGS. 3 to 8 show the brake mechanism of the present invention applied to a wheel hub.

Figure 3:
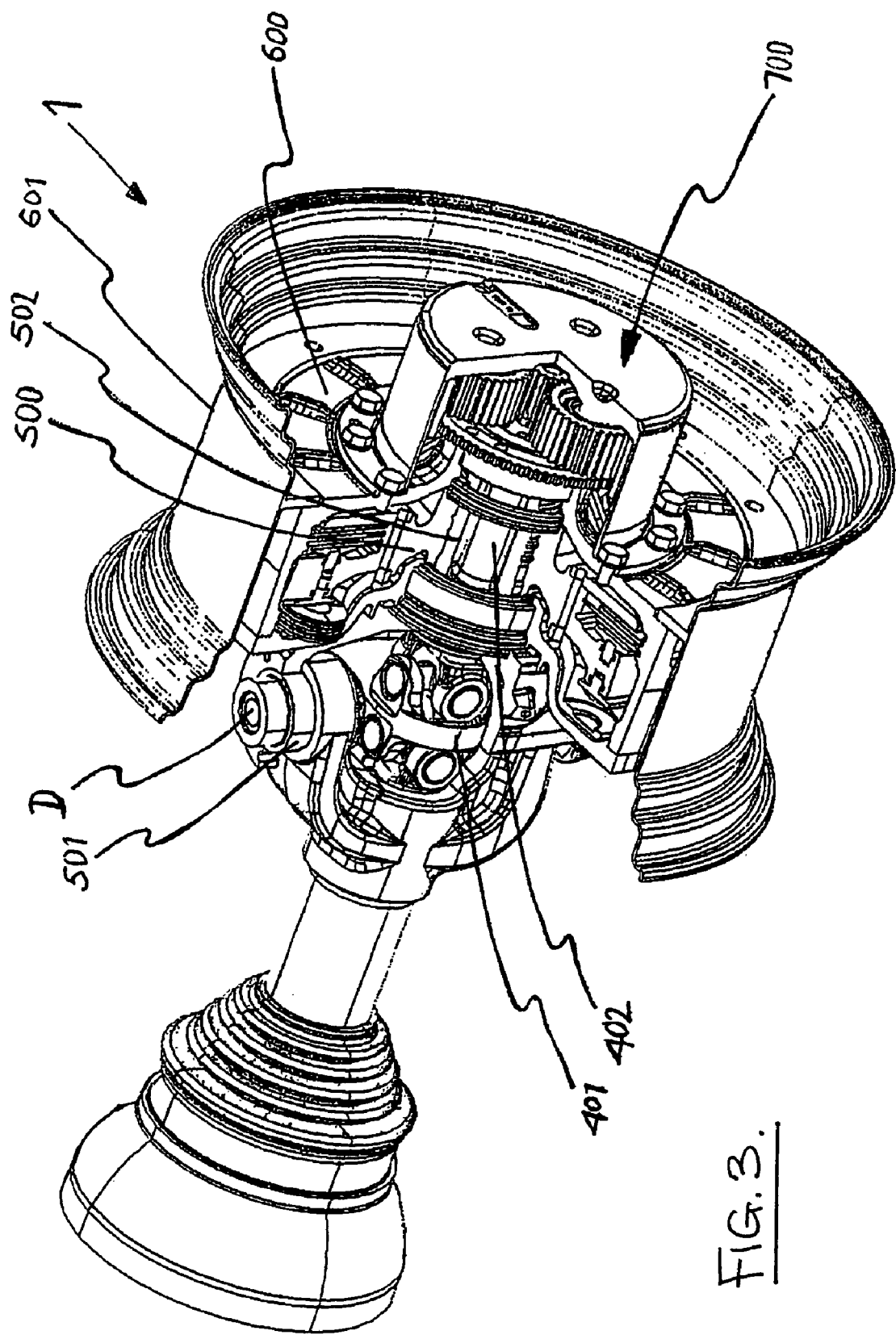
FIG. 3 shows a partially cut perspective view of a wheel drive shaft and a wheel head with rim using a brake mechanism in accordance with the present invention.

FIG. 3 shows a partially cut perspective view of a final drive of a wheel 1 in an agricultural utility vehicle. A drive moment is transmitted in a drive train (not shown) from an internal combustion engine (not shown) via speed-transforming gears and differentials (not shown) to a drive shaft 400 (cf. FIG. 4). Since the wheel 1 is steered wheel in this embodiment a joint 401 is provided via which the drive moment is transmitted from the drive shaft 400 to a hub shaft 402 even if drive shaft 400 and the hub shaft 402 are at an angle to each other.

A fixed body in the form of a wheel bearer 500 is connected by steering bearings 501 to the vehicle body in such a way that the wheel bearer 500 can be swivelled about the axis D relative to the vehicle body. The hub shaft 502 is mounted in a hole 502 centrally located in the wheel bearer 500. The wheel bearer 500 is connected by the steering bearings 501 to a vehicle body in such a way that is cannot twist relative to the body about an axis formed by the hub shaft 502.

A rotational body in the form of a wheel head 600 is arranged around the wheel bearer 500 and is rotatably mounted on the wheel bearer 500. A wheel rim 601 is fastened to the wheel head 600. The wheel head 600 is driven by the hub shaft 402 via a planetary gear set 700 and rotates about its axis of symmetry around the wheel bearer 500.

Although the wheel bearer 500 and the wheel head 600 are each made from multiple pieces, they have each been provided with uniformly oriented hatching to increase the clarity in the cut views FIGS. 4 to 7. Using the hatching orientation it is therefore possible to see whether a component is rotatable about an axis formed by the hub shaft 402 or is fixed.

The final drive of wheel 1 and the planetary gear set 400 will be described hereinafter.

Figure 4:
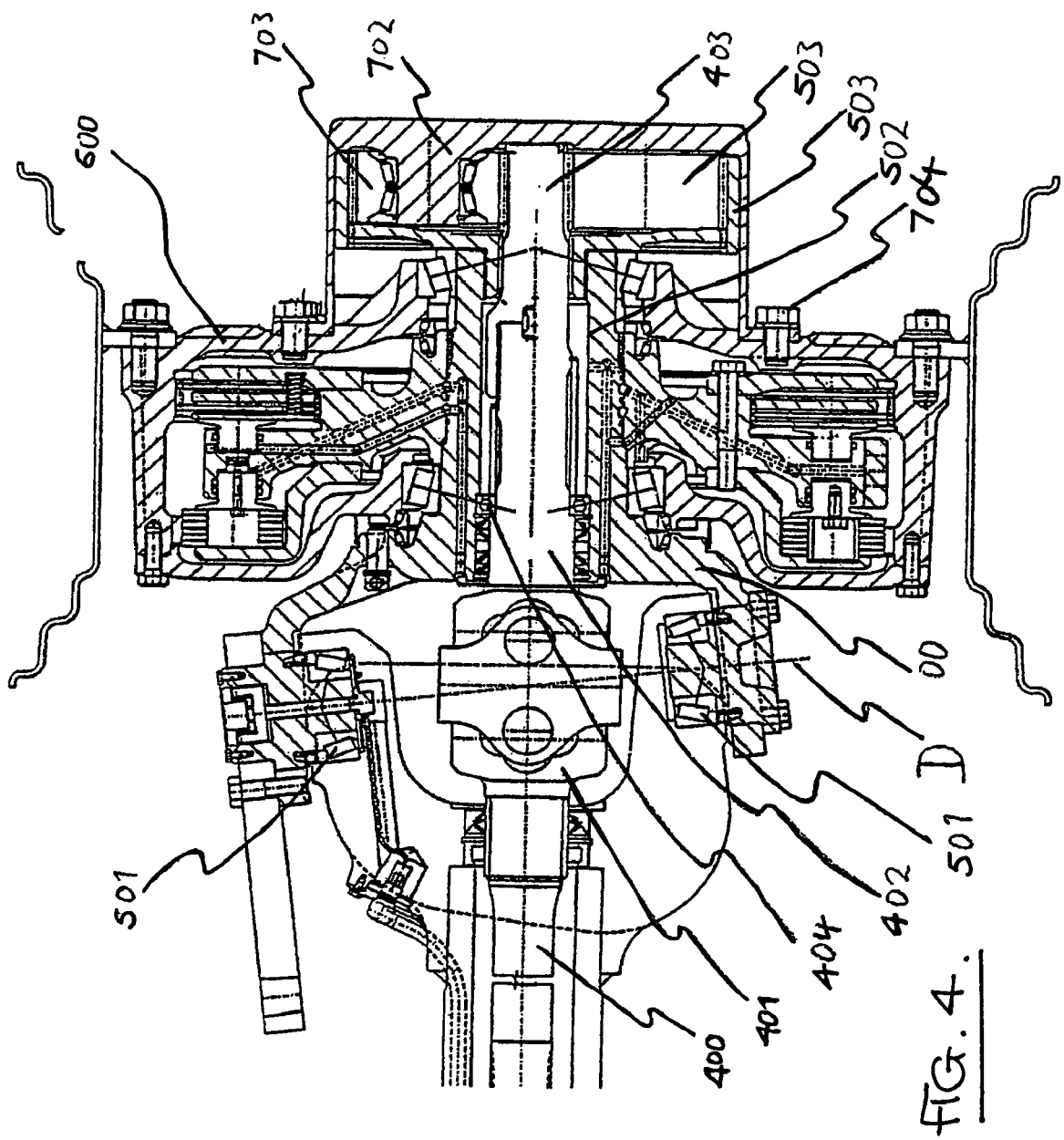
FIG. 4 shows a vertical section through the wheel head of FIG. 2.

As may be seen in FIG. 4, the hub shaft 402 is mounted in the hole 502 via a ball bearing 404. An end portion of the hub shaft 402 forms a sun wheel 403 of the planetary gear set 700. Three planetary wheels 703 are mounted on the wheel head 600 via a planetary carrier 702 and are engaged by the sun wheel 403. A ring gear 503 is non-rotatably fastened to the wheel bearer 500 and is engaged with the planetary wheels 703. Since the wheel bearer 500, and therefore the ring gear 503, is non-rotatable with respect to the hub shaft 402 a rotation of the hub shaft 402 is reduced by the planetary gear set 700 and transmitted into a rotation of the planetary carrier 702. Since the planetary carrier 702 is connected by screws 704 to the wheel head 600, the wheel head 600 is rotated hereby. This results in a rotational speed of the wheel head 600 which is lower by a factor of ten to sixteen than the rotational speed of shaft 100 in the drive train.

The construction of the wheel head 600 will be described hereinafter.

Figure 5:
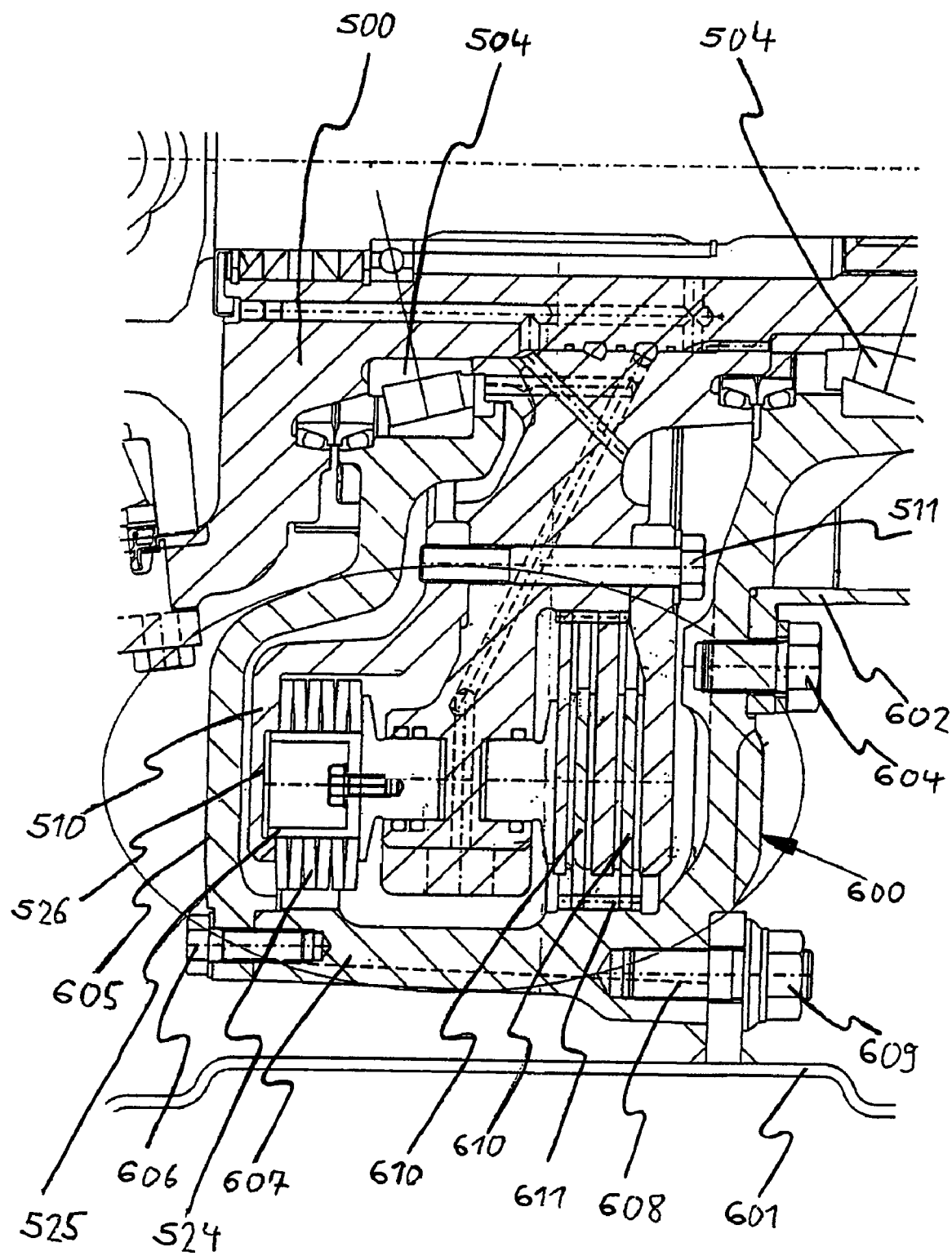
FIG. 5 shows a vertical section through in more detail of the lower half of FIG. 4.

As may be seen in FIG. 5, the wheel head 600 is mounted via tapered roller bearings 504 on the wheel bearer 500 so as to rotate about an axis formed by the hub shaft 402. The wheel head 600 is constructed in two pieces for assembly. An inner housing 605 is connected by screws 606 to an outer housing 607. The rim 601 is attached to the outer housing 607 by threaded bolts 608 and screw nuts 609. Inner housing 605 and outer housing 607 enclose a space which receives part of the wheel bearer 500 and the brake mechanisms described below. A plurality of rotatable brake discs in the form of wheel head brake discs 610 are arranged inside this cavity. The wheel head brake discs 610 are non-rotatably connected to the wheel head 600 by internal teething 611, so they rotate with the wheel head. The wheel head brake discs 610 also exhibit axial displaceability with respect to the wheel head 600.

The construction of the wheel bearer 500 will be described hereinafter.

Figure 6:
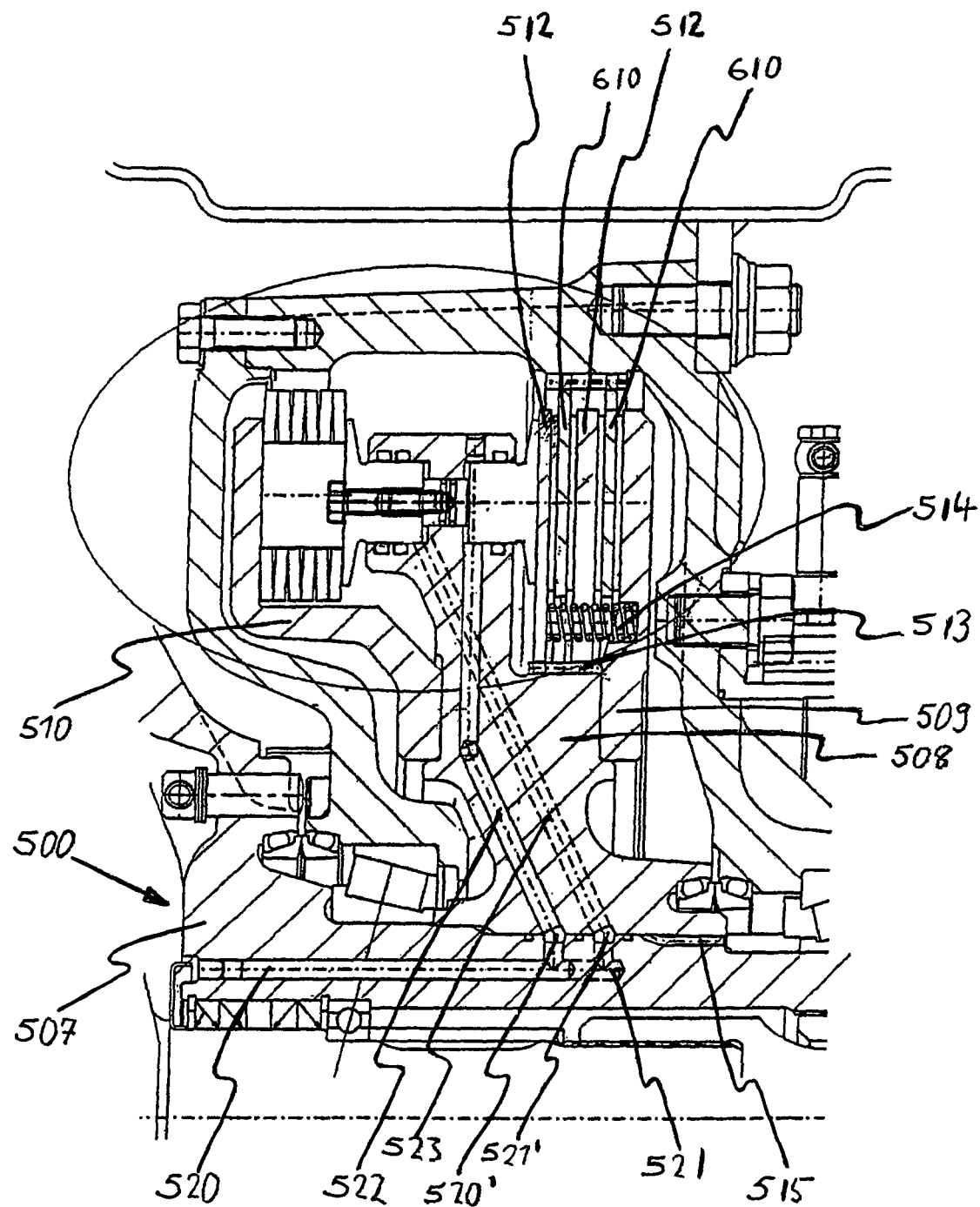
FIG. 6 shows a vertical section in more detail of the upper half of FIG. 4.

As is shown in FIG. 6, the wheel bearer 500 is constructed in multiple pieces for assembly and comprises a hub portion 507, a centre carrier 508, a stop mechanism in the form of a pressure plate 509, and a spring carrier 510. The pressure plate 509 and the spring carrier 510 are non-rotatably screwed to the centre carrier 508 by screws 511 (cf. FIG. 5). The centre carrier 208 is non-rotatably connected to the hub portion 507 by a spline fitting 515.

A plurality of fixed brake discs in the form of wheel bearer brake discs 512 are arranged between the centre carrier 508 and the pressure plate 509. These fixed brake discs are non-rotatably connected by external teething 513 to the centre carrier 508 and exhibit axial displaceability. The wheel bearer brake discs 512 and the wheel head brake discs 610 are alternately arranged and form a brake disc assembly. The wheel bearer brake discs 512 and the pressure plate 509 are kept at a distance by a restoring spring 514 and the brake disc assembly is thus opened. In this open state the wheel bearer brake discs 512 and the wheel head brake discs 610 can be moved relative to each other and the wheel head 600 can rotate relative to the wheel bearer 500.

At least two axial holes 520, 521 are provided in the hub portion 507 and are connected by a groove 520' or 521'. The grooves 520', 521' are constructed in a surface of the hub portion 507 so as to be encircling and when assembled with the centre carrier 508 each form a channel. One or more radial hole(s) 522, which are provided in the centre carrier 508, are connected to the groove 520'. One or more radial hole(s) 523, which are provided in the centre carrier 508, are connected to the groove 521'. The axial holes 520, 521 are each connected to a hydraulic system and are used to bleed a parking brake or to actuate a service brake.

Figure 7:
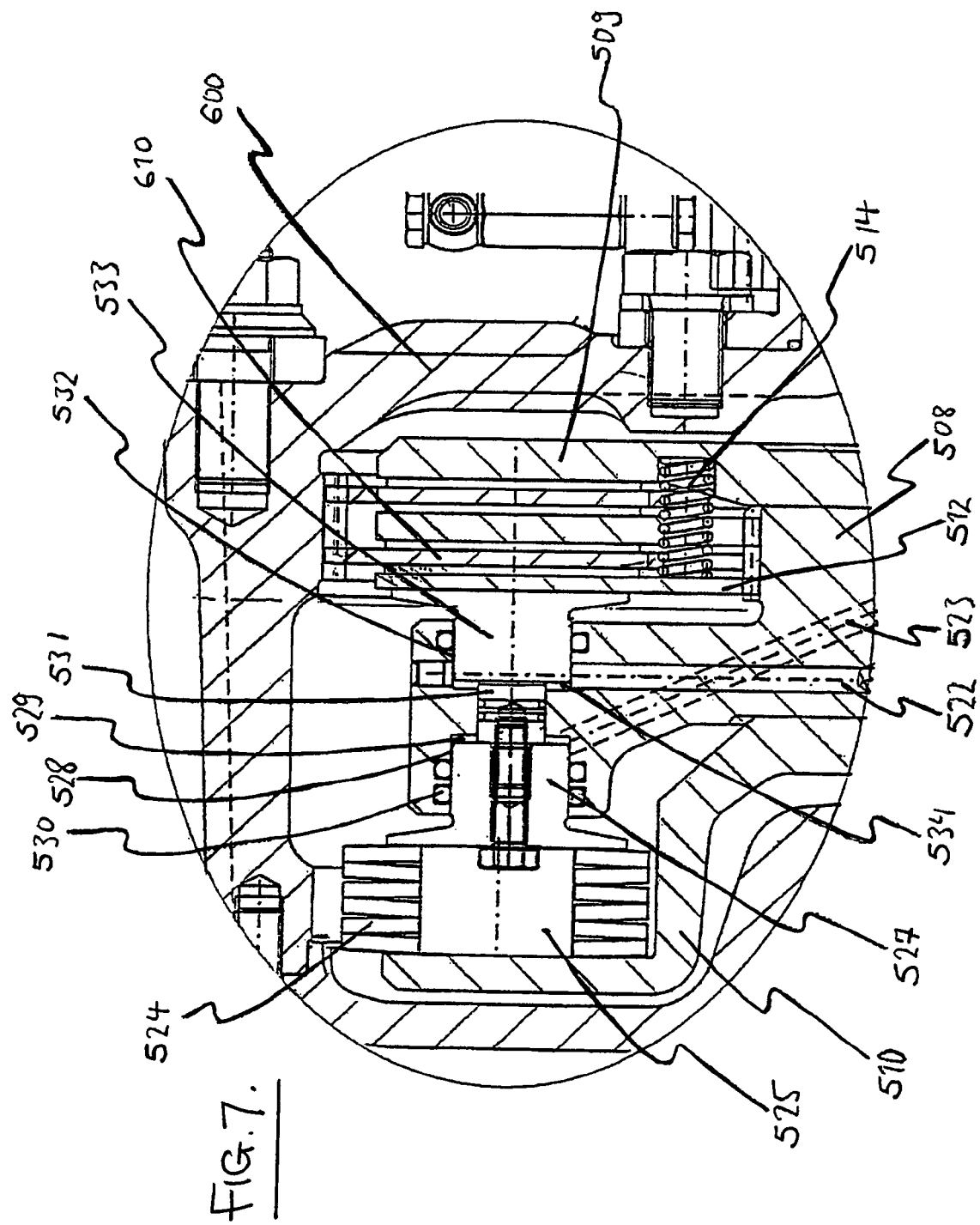
FIG. 7 shows part of FIG. 6 and on a larger scale.

The mechanism for a parking brake and a service brake will be described hereinafter with reference to FIGS. 5 and 7.

Eight disc spring assemblies 524 are provided in the wheel bearer 500 between the spring carrier 510 and the centre carrier 508 and are distributed at equal intervals over the periphery of the spring carrier 510.

As shown in FIG. 5, the disc spring assemblies are displaceably located on guides 525. The guides 525 are arranged in indentations 526 which are provided in the spring carrier 510 and position the disc spring assemblies 524. The guide 525 is screwed to an edge of a parking brake annular piston 527 that is widened in the manner of a flange and the disc spring assembly 524 exerts an immobilising force on the parking brake annular piston 527 which acts to the right with respect to FIG. 7.

Figure 8:
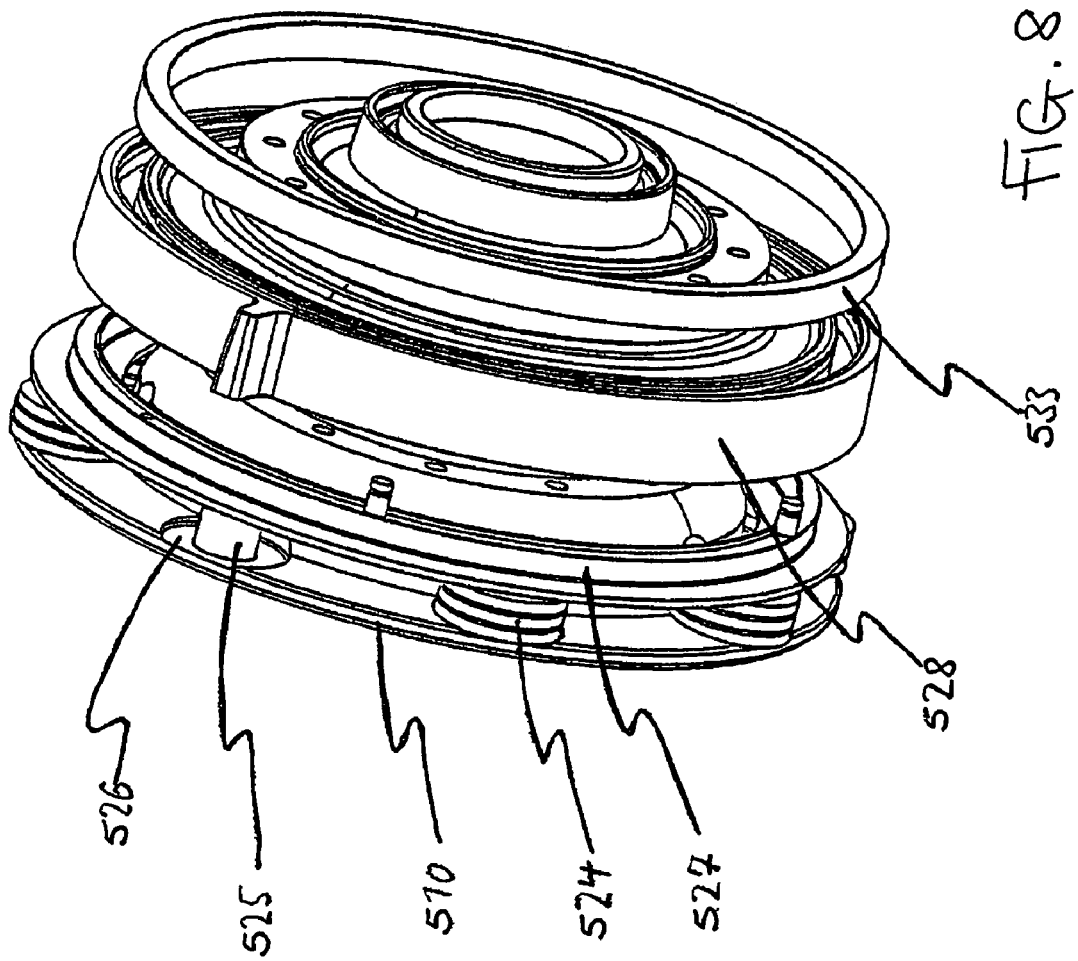
FIG. 8 shows a perspective view of annular pistons used in a brake mechanism according to the invention.

As may be seen in FIG. 8, the parking brake annular piston 527 is constructed as a ring around the periphery of the wheel bearer 500. As can be seen in FIG. 7, an encircling parking brake groove 528 is provided in the centre carrier 508 into which the parking brake annular piston 527 is placed. The bottom of the parking brake groove 528, together with the parking brake annular piston 527, forms a parking brake piston chamber 529 which is connected to the radial hole 523. This parking brake piston chamber 529 is used as a hydraulic chamber and can be filled with a hydraulic fluid via the radial hole 523. The thus produced stroke of the parking brake annular piston 527 generates a bleeding or brake releasing force which counteracts the immobilising force of the disc spring assemblies 524, whereby the spring assemblies 524 are pressed together between the parking brake annular piston 527 and the spring carrier 510. The parking brake piston chamber 529 is sealed by O-rings 530. Counteracting of the brake apply force will be called bleeding or brake releasing hereinafter.

Six intermediate pistons 531 are screwed to the parking brake annular piston at equal intervals from each other (cf. also FIG. 8). The intermediate pistons 531 sit in holes in the centre carrier 510 and project into an encircling service brake groove 532. A service brake annular piston 533 is provided in the service brake groove 532 and, together with the bottom of the service brake groove 532, forms a service brake piston chamber 534. The service brake piston chamber 534 is connected to the radial hole 522 and can be filled with a hydraulic fluid thereby. A pushing force acts on the service brake annular piston 533 as a result, whereby the piston is pushed out of the groove and against a wheel bearer brake disc 512. The immobilising force is transmitted via the intermediate pistons 231 to the service brake annular piston 233.

The force application points of the immobilising force, the brake release force and the pushing force are arranged in a straight line. This means the immobilising force, the brake release force and the pushing force also act in individual force components along or counter to a common linear force flow. They therefore also act coaxially in individual force components. The spring assemblies 524, the parking brake annular piston 527, the parking brake hydraulic chamber 529, the intermediate pistons 531, the service brake hydraulic chamber 534, the service brake annular piston 534 and the brake disc assembly are arranged in a line so as to be aligned with each other. This applies not only to the case in which all of the forces of the annular elements are considered but in particular the case in which forces of the individual segments of the annular elements are considered. In other words, the annular force-transmitting components, such as the parking brake annular piston 527 and the service brake annular piston 534, are coaxial and have the same radius; the remaining force-transmitting components, such as the spring assemblies 524 and the intermediate pistons 531, are arranged on this radius. A cylindrical active plane with this radius is therefore produced, along which plane all forces act.

The function of the brake mechanism will be described hereinafter with reference to FIG. 7.

In the initial state the disc spring assembly 524 is supported on the spring carrier 210 and exerts an immobilising force on the parking brake annular piston 527 in the axial direction. This force is exerted via the intermediate pistons 531 on the service brake annular piston 533 in such a way that the brake disc assembly 512, 510 is pressed together between the service brake annular piston 533 and the pressure plate 509. Thus relative movement between the wheel bearer brake discs 512 and the wheel head brake discs 610 is prevented by friction, whereby rotation of the wheel head 600 relative to the wheel bearer 500 is prevented. A linear, straight force flow is produced in this connection and acts from the disc spring assemblies 524 via the parking brake annular piston 527, the intermediate pistons 531, the service brake piston 533 and the brake discs 512, 610 on the pressure plate 509.

If an operator releases the parking brake, the parking brake piston chamber 529 is filled with a hydraulic fluid and the parking brake annular piston 527 is pushed from the centre carrier 508, counter to the immobilising force of the disc spring assemblies 524. At the same time the service brake annular piston 533 is relieved of the immobilising force which is transmitted via the intermediate pistons 532. The wheel bearer brake discs 512 and the wheel head brake discs 610 can thereby be separated from each other via the restoring spring 514. The friction between the brake discs is cancelled hereby and the wheel head 600 can rotate relative to the wheel bearer 500.

If the service brake is actuated by an operator the service brake piston chamber 534 is filled with hydraulic fluid and the service brake annular piston is pushed from the service brake groove 533, counter to the force of the restoring spring 514, against one of the wheel bearer brake discs 512. The wheel bearer brake discs 512 and the wheel head brake discs 610 are pressed against each other again hereby and rotation of the wheel head 630 relative to the wheel bearer 500 is decelerated or halted by friction.

If the parking brake piston chamber 529 and the service brake piston chamber 534 loose hydraulic fluid in the event of failure of the hydraulic system, the immobilising force of the disc spring assembly 524 acts on the service brake annular piston 533 again, whereby, in a manner comparable to the service braking operation, rotation of the wheel head 600 relative to the wheel bearer 500 is decelerated. Since the brake disc assembly 512, 610 is acted on via the service brake annular piston 533 in this case as well, the parking brake, in addition to fixing a resting wheel 1, can decelerate and halt a rotating wheel 1 in the same manner as via the service brake, without overheating problems having to be anticipated as only service brake elements have to be employed within their intended use in this connection.

It is obvious to a person skilled in the art that the invention can also be used aside from the described embodiment. Thus it can also be used for example on a non-driven and/or non-steered wheel.

The invention claimed is:

1. A brake mechanism for a utility vehicle, comprising:
a non rotatable fixed body,
a rotatable body rotatable relative to the fixed body,
at least one brake disc which is non-rotatable relative to the fixed body,
at least one rotating brake disc which is fixed for rotation with the rotatable body,
a stop surface on the fixed body,
a first annular hydraulic piston extending from a first annular hydraulic actuating chamber in a first side of the fixed body in a first axial direction and which, when the first annular chamber is pressurised, presses the fixed brake disc and the rotating brake disc against each other and against the stop surface to apply the brake,
a spring mechanism which exerts an immobilising force on the first annular actuating piston member via circumferentially spaced intermediate pistons to press the fixed brake disc and the rotating brake disc against each other to apply the brake, and
a second annular hydraulic piston extending from a second annular hydraulic actuating chamber in a second side of the fixed body in a second axial direction opposite to the first axial direction and interposed between the spring means and the intermediate pistons, the second annular piston, when the second annular chamber is pressurised, exerting a brake release force which counteracts the immobilising force of the spring mechanism so that the first piston no longer presses the fixed brake disc and the rotating brake disc against each other via the intermediate pistons.

2. A brake mechanism according to claim 1, wherein the lines of action of the spring mechanism (524) and the intermediate pistons (531) are approximately aligned and are at approximately the same radius as the lines of action of the first and second annular pistons.

3. A brake mechanism according to claim 1, wherein the spring mechanism is a plurality of disc spring assemblies circumferentially distributed around the second annular piston.

4. A brake mechanism according to claim 1 wherein a plurality of coil spring assemblies are circumferentially distributed around the first annular piston to disengage the brake when the second annular chamber is pressurised.

5. A brake mechanism according to claim 1 wherein the rotatable body is a wheel head housing and the fixed body is a wheel bearer or a component non-rotatably connected thereto.

6. A brake mechanism according to claim 1, where the brake mechanism is a wet brake.

* * * * *